Dec. 26, 1933. W. E. HORROCKS 1,941,209

ROLLER BEARING SEPARATOR

Filed April 20, 1931

INVENTOR
WALTER E. HORROCKS
BY John A. Brumhardt
ATTORNEY

Patented Dec. 26, 1933

1,941,209

UNITED STATES PATENT OFFICE 1,941,209

ROLLER BEARING SEPARATOR

Walter E. Horrocks, Lakewood, Ohio

Application April 20, 1931. Serial No. 531,429

3 Claims. (Cl. 308—217)

This invention relates to roller bearing separators or spacers, which are also referred to as cages, and has for its object to provide improved means for holding the rollers in such bearings an equal distance apart, and allowing a maximum amount of vertical and horizontal motion of the spacer without the friction of the rollers wearing the spacer in such a contour or shape that the rollers become wedged or jammed between the spacer, or between the spacer and the roller retaining plates, or raceways.

The roller bearings referred to are of the thrust type which are extensively used as pivot bearings in the front wheel knuckle pins of automobiles. Present roller bearing spacers which are made of thin metal allow the spacer to wear off on the outer edges and the edges between the rollers. When the edges between the rollers have worn down the rollers climb or jam between the worn edges of the spacers and the retainers or raceway which cause the entire bearing to freeze and become inoperative.

To overcome this difficulty I have invented a spacer which is somewhat greater in thickness than one-half the diameter of the rollers. The spacer being considerably thicker than one-half of the diameter of the rollers prevents the rollers from wearing off the edges of the spacer in a contour which would allow the rollers to climb on the top of the spacer and jam between the spacer and the roller retainer or raceway, which would thereby prevent the rollers from rotating or revolving.

The actual wear on the spacer will be on the side of the spacer in the shape of a concave contour which at no time will allow the roller bearing to climb over the spacer and jam between the retainers. The spacer being made of a thickness less than the diameter of the rollers allows ample play or movement of the spacer between the roller retainer or raceways. This arrangement allows freedom of motion for the rotation of the spacer and the rollers at all times.

This invention is illustrated in the accompanying drawing in which.

Figure 1:
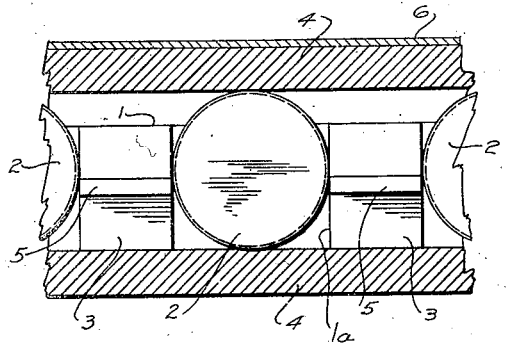
Fig. 1 is a fragmentary section showing the spacer, rollers, roller retainers and casing or jacket.
Figure 2:
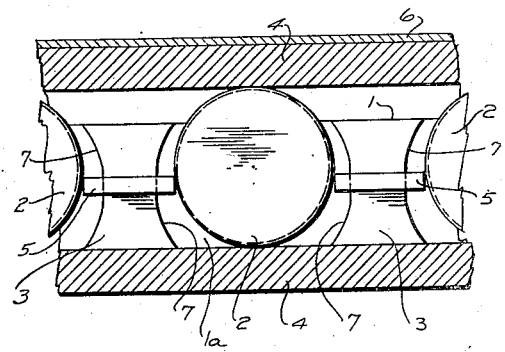
Fig. 2 is a similar section showing the concave contour in the sides of the roller bearing spacer spokes as when caused by the wear or friction against the sides of the spacer spokes.
Figure 3:
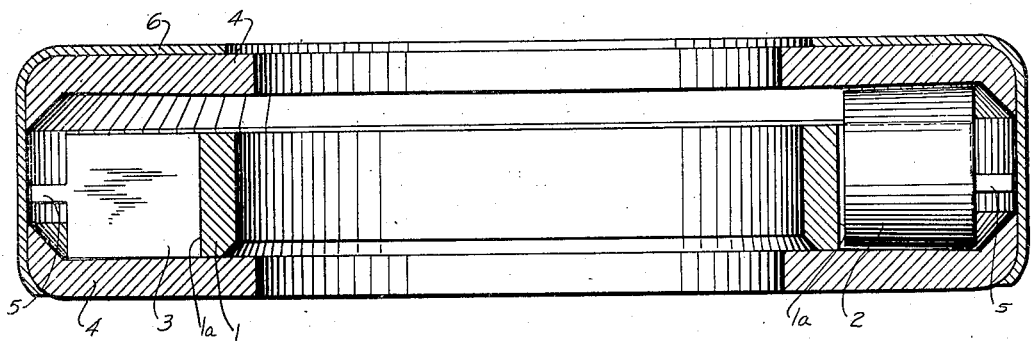
Fig. 3 is a cross sectional view through the center of the roller bearing showing one spoke of the roller bearing separator without the roller in place, and one spoke with the roller in place.
Figure 4:
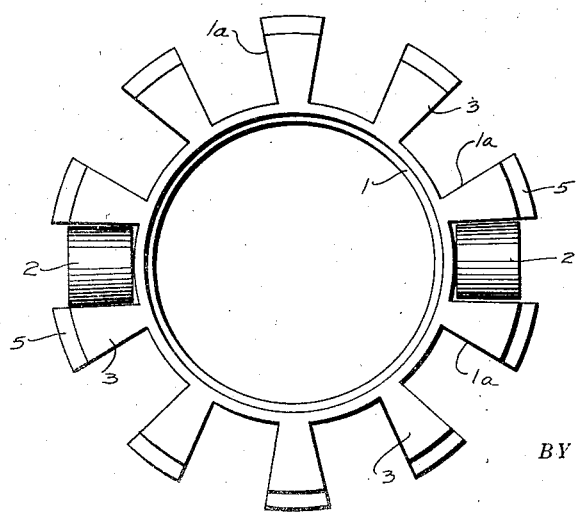
Fig. 4 shows the spacer with one roller bearing set in place between two spokes of the spacer.

Referring specifically to the drawing in which similar numerals of reference indicate similar parts, 1 is the roller bearing separator recessed or cut away in the shape of slots 1a at the outer edge to form spaces for the rollers 2 to rotate between the spokes 3 of the roller separator 1.

The roller separator 1 is a ring slightly less in thickness than the diameter of the rollers 2. The spokes 3 extend between the rollers 2 substantially to the outer edge of the roller retainers or races 4. Spokes 3 are milled on the outer edge as at 5 to a thickness suitable to freely rotate between the roller retainers or races 4.

The complete assembly of rollers 2, roller separator 1 and roller retainers or races 4 are held together by a spun casing or jacket 6 which prevents the parts from becoming separated thus allowing the free rotation of the rollers 2 and the separator 1 between the roller retainers or races 4.

As the rollers 2 rub against the sides of the separator spokes 3 the wear on the sides of the roller separator spokes 3 wears in the form of a concave shape 7. This concave shape allows the free movement of the rollers 2 after the device has been used even for a great length of time.

If the device is used for such a length of time that the rollers 2 would cause such excessive wear on the sides of the separator spokes 7 that the rollers would tend to wabble in an irregular line of travel the rollers 2 would still be confined in their separate spaces between the separator spokes 3 without rolling over the edges of the separator spokes 3 and jamming against the retainers 4.

The device can be used in all types of roller or ball bearings which are used as thrust bearings, and will allow any amount of vibration which will tend to throw the separator to the top or bottom side of the bearing without allowing the rollers to jam or climb over the edges of the separator.

I claim:

1. In a bearing, the combination with opposite races, and rollers between the same and in contact with both, of a separator comprising a ring having spokes projecting between the rollers, the axial thickness of the ring and spokes being the same and being greater than one-half the diameter of the rollers and substantially less than the space between the races, whereby the separator is freely movable axially of the bearing, between the races.

2. In a bearing, the combination with opposite races, and rollers between the same and in contact with both, of a unitary separator comprising a ring between the races having roller-spacing projections extending radially between the rollers, said projections being of greater thickness, axially of the bearing, than half the diameter of the rollers, and substantially less thickness than the space between the races, whereby the separator is freely movable axially between the races and across the adjacent faces of the rollers, the sides of the projections contacting the rollers being flat and tangent to the rollers.

3. The combination stated in claim 1, the outer ends of the spokes being recessed on opposite sides to form reduced extensions at said ends projecting beyond the outer ends of the rollers.

WALTER E. HORROCKS.